United States Patent [19]
Jansen

[11] Patent Number: 5,682,306
[45] Date of Patent: Oct. 28, 1997

[54] SWITCHED MODE POWER SUPPLY WITH POWER FACTOR CORRECTION

[75] Inventor: Arian Jansen, Crolles, France

[73] Assignee: Hewlett-Packard Company, Palo Alto, Calif.

[21] Appl. No.: 675,301

[22] Filed: Jul. 1, 1996

[30] Foreign Application Priority Data

Jul. 31, 1995 [EP] European Pat. Off. ............ 95410076

[51] Int. Cl.$^6$ ................................................ H02M 7/217
[52] U.S. Cl. ........................................ 363/89; 363/16
[58] Field of Search ................................ 363/16, 37, 89, 363/20, 21, 40; 323/222

[56] References Cited

U.S. PATENT DOCUMENTS

| | | | |
|---|---|---|---|
| 4,184,197 | 1/1980 | Cuk et al. | 363/16 |
| 4,257,087 | 3/1981 | Cuk | 363/16 |
| 5,134,355 | 7/1992 | Hastings | 323/211 |
| 5,442,534 | 8/1995 | Cuk et al. | 363/16 |
| 5,442,539 | 8/1995 | Cuk et al. | 363/89 |

FOREIGN PATENT DOCUMENTS 8603902  7/1986  WIPO .

OTHER PUBLICATIONS

Apec '94 Ninth Annual Applied Power Electronics Conference and Exposition, vol. 2, 13–17 Feb. 1994 Orlando, Fl., USA pp. 569–575, XP 000467366.
Jovanovic & Lee 'Reduction of voltage stress in integrated high–quality rectifie–regulators by variable–frequency control' *p. 570, left column, line 28 –p. 571, left column, last line; fig. 1.
Proceedings of the Annual Power Electronics Specialists Conference, Massachusetts, 25–27 Jun., 1991, No. Conf. 22, Institute of Electrical and Electronics Engineers, XP 000278420.
Sebastian J 'Improving Power Factor Correction in Distributed Power Supply Systems Using PWM and ZCS–QR Sepic Topologies' *p. 785, left column; figs. 8,11*.

Proceedings of the Annual Power Electronics Specialists Conference Taipei, Taiwan, Jun. 20–24, 1994, vol. 1,20 Jun. 1994 Society, pp. 336–341, XP 000492035.

Spiazzi G et al 'High–Quality Rectifier Based on Coupled–Inductor Sepic Topology' *p. 336, right column, line 3–p. 337, right column, line 2;– figs. 1,2*.

*Primary Examiner*—Adolf Berhane

[57] ABSTRACT

A switched mode power supply is provided which combines voltage regulation and power factor correction in a single converter stage. The power supply comprises a bridge rectifier feeding a double rectified voltage sine wave to a flyback converter comprising input and output circuits connected by an energy-storing transformer. The input circuit comprises an energy-storing inductor, a switching device connected in series with the inductor across the output of the bridge rectifier, a control arrangement for controlling the cyclic turning on and off of the switching device, and a coupling capacitor connected in series with the primary winding of the transformer across the switching device. The control arrangement comprises switch-on timing means for turning on the switching device upon a turn-on condition being reached in which the inductor and transformer have stored energy levels such that the inductor and transformer are equally balanced to charge one another, and on-time control means for maintaining the switching device on for a period dependent on the desired value of said regulated dc output voltage. In this manner, the converter input current is made proportional to the input voltage giving the desired high power factor.

18 Claims, 7 Drawing Sheets

SWITCHED MODE POWER SUPPLY WITH POWER FACTOR CORRECTION

FIELD OF THE INVENTION

The present invention relates to a switched mode power supply with power factor correction.

BACKGROUND OF THE INVENTION

Switched mode power supplies are frequently used in electronic equipment for producing a regulated dc output from an ac mains input. A switched mode power supply for such an application typically comprises a rectifier unit for producing a rectified and at least partially smoothed dc output, and a DC/DC converter such as a flyback or forward converter coupled to the rectifier unit. The DC/DC converter normally serves not only to produce a regulated dc output but also to provide isolation of the output from the ac mains input.

A switched mode power supply of the above form will generally exhibit a poor (low) power factor, this latter being the ratio of the true power drawn by the power supply to the product of the RMS values of the actual voltage and current. The discrepancy between the two values is due to the harmonic distortion of the rectifier unit and the smoothing capacitors.

There is an increasing trend to require that even relatively low power equipment complies with tight power factor requirements in order to minimise the problems that low power factors cause in the ac mains generation and distribution networks.

Various techniques are known for managing the power factor exhibited by a piece of equipment and the term "power factor correction" is used generally in this specification to cover all techniques for effecting such management.

One known approach to providing power factor correction in switched mode power supplies is to dispense with the large capacitors generally provided in the rectifier unit and then seek to cause the current drawn during each switching cycle of the downstream converter to be proportional to the instantaneous value of the rectified half sine wave input voltage (the switching frequency being much higher than the mains frequency). By arranging for the current drawn by the converter to be proportional to the input voltage, the converter (and thus the switched mode power supply) appears resistive in nature with a high power factor.

Figure 1:
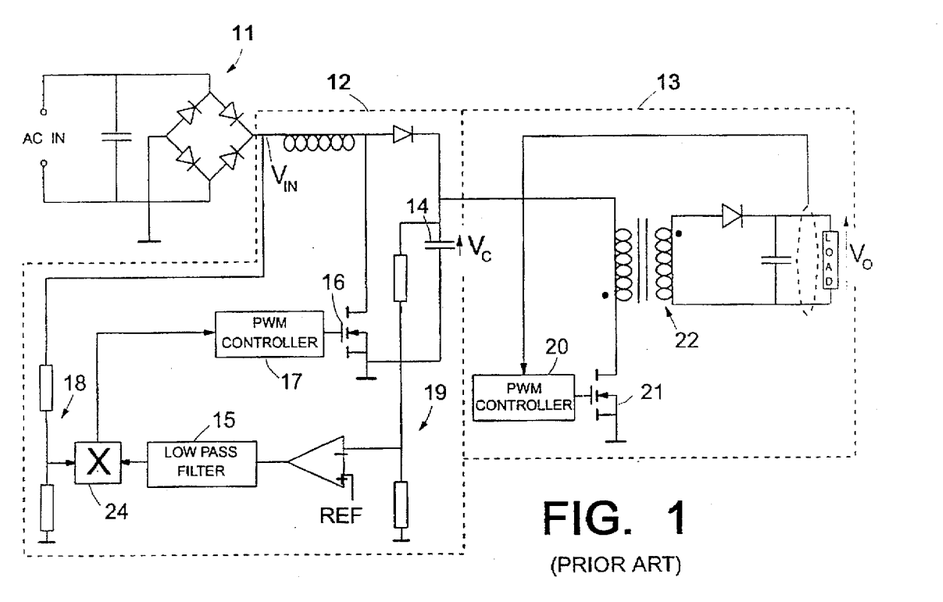
FIG. 1 is a circuit diagram of a known switched mode power supply with power factor correction.

As the current drawn by a standard DC/DC converter, such as a flyback or forward converter, is not proportional to the input voltage, special converter configurations have been devised to achieve the desired result and one such configuration is shown in FIG. 1 of the accompanying drawings.

The switched mode power supply shown in FIG. 1 comprises a bridge rectifier 11 feeding a boost regulator 12 which, in turn, supplies a flyback converter 13. In effect, the boost regulator 12 stores energy in a reservoir capacitor 14 at a voltage above the maximum of the rectified output from the bridge rectifier 11, and the flyback converter 13 then runs off the energy source constituted by the capacitor 14.

The boost regulator 12 is arranged to charge the capacitor 14 with a current proportional to the rectified voltage $V_{IN}$ produced at the output of the bridge 11 whereby to present itself as a resistive load to the ac mains. To this end, the duty cycle of the switching device (MOSFET) 16 of the regulator 12 is controlled by a fixed-frequency pulse width modulation (PWM) control block 17 that is responsive to the instantaneous value of $V_{IN}$ (as sensed via a potential divider network 18) to increase the on time of the switching device 16 in proportion to the sensed value of $V_{IN}$. The natural characteristics of the boost regulator are such that when operated in a continuous mode, the average input current will be proportional to the on time of the duty cycle of the switching device 16 provided that the voltage $V_C$ is constant; this latter may be assumed to be the case on the, time scale of the ac mains frequency in view of the magnitude of the capacitor 14. In fact, to maintain the voltage $V_C$ at a substantially constant level, it is also necessary to adjust the duty cycle of the switching device 16 in dependence on the value of $V_C$ (as sensed via potential divider network 19); however, low pass filter 15 ensures that this adjustment is on a longer timescale to that of the variation in voltage $V_{IN}$. Since the input signal of the PWM control block 17 must still have the same shape as the converter input voltage as sensed by the divider network 18, the output of the low pass filter 15 is multiplied by the sensed input voltage in multiplier 24 before being fed to the PWM control block 17.

The flyback converter 13 is of standard form and includes a pulse width modulation (PWM) control block 20 responsive to the value of the output voltage $V_O$ of the converter 13 to regulate the duty cycle of the converter switching device (MOSFET) 21 whereby to maintain the output voltage $V_O$ at a desired level (the loopback electronics, including a reference for setting the desired output voltage level, are incorporated in the control block 20). The transformer 22 of the flyback converter provides the isolation between the ac mains input "AC IN" and the output voltage $V_O$.

The switched mode power supply of FIG. 1 whilst effective in its goal of power factor correction, is expensive due the need for a multiplier, two PWM controllers and two switching devices.

It is an object of the present invention to provide a switched mode power supply with power factor correction that is less expensive and simpler in design.

Figure 2:
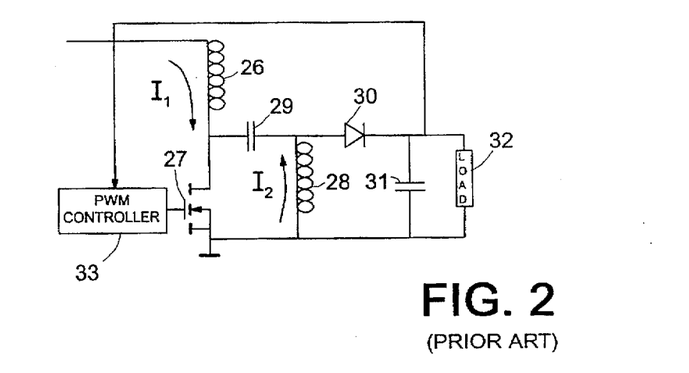
FIG. 2 is a circuit diagram of a SEPIC regulator forming part of the prior art.

Before proceeding with a summary of the present invention, attention will first be drawn to another known regulator, the so-called SEPIC (Single Ended Primary Inductance Converter) regulator shown in FIG. 2 of the accompanying drawings. This regulator is mentioned because the general configuration of its main circuit elements has similarities to that of the present invention though the control of the switching device of the SEPIC regulator differs substantially from that of the switching device used in the present invention. It may also be noted that the SEPIC regulator has no apparent application to power factor correction. The SEPIC regulator, though not widely used, has found occassional application to the boosting of a smoothed input voltage without inverting its polarity. The SEPIC regulator is not a ready candidate for use in a mains power supply unit due to its lack of a transformer to provide isolation.

Briefly, and with reference to FIG. 2, the SEPIC converter comprises a first energy-storing inductor 26 connected in series with a switching device 27 across the input to the regulator, and a second energy-storing inductor 28 connected in series with a capacitor 29 across the switching device 27. A diode 30 connects the junction of the second inductor 28 and capacitor 29 with an output reservoir capacitor 31 and load 32. The switching device 27 is controlled by a fixed-frequency PWM controller 33 responsive to the value of the output voltage $V_O$ to adjust the duty cycle of the device 27 such as to maintain $V_O$ constant. The values of both capacitors 29 and 31 are sufficiently large that the ripple across them at the switching frequency of the device 27 is small and may be ignored; the voltage across capacitor 29 is equal to the input voltage $V_{IN}$.

Although a number of operating modes are possible, the most commonly used mode is one in which current flows continuously through both inductors 26 and 28. In this mode, when the switching device is on, diode 30 is cut off and the load is supplied from capacitor 31; current $I_1$ builds through inductor 26 storing energy in it and similarly current $I_2$ builds up through the inductor 28 storing energy in this inductor. When switching device 27 is off, the diode 30 conducts and energy is transferred from inductors 26 and 28 to the capacitor 31 and the load, the currents $I_1$ and $I_2$ through these inductors falling progressively. The switching device is then turned on again and the cycle of operation recommenced.

SUMMARY OF THE INVENTION

According one aspect of the present invention, there is provided a power supply comprising a rectifier arrangement for receiving an ac input and producing a rectified output at an output of the rectifier arrangement, and a flyback converter comprising an input circuit connected to the output of the rectifier arrangement, an output circuit for providing a regulated dc output voltage, and an energy-storing transformer that has primary and secondary windings respectively connected into said input and output circuits; the input circuit comprising:

an energy-storing inductor, a switching device connected in series with said inductor across the output of the rectifier arrangement, a control arrangement for controlling the cyclic mining on and off of the switching device at switching frequencies substantially greater than the frequency of said ac input, and a coupling capacitor connected in series with the primary winding across said switching device and valued to present a low impedance at said switching frequencies but a substantially higher impedance at the frequency of said ac input;

the control arrangement comprising switch-on timing means for turning on the switching device upon a turn-on condition being reached in which the inductor and transformer have stored energy levels such that the inductor and transformer are equally balanced to charge one another, and on-time control means for maintaining the switching device on for a period dependent on the desired value of said regulated dc output voltage.

By controlling the switching device in this manner, the input current is made proportional to the input voltage, thereby giving the desired resistive behaviour.

Preferably, the inductance values of the inductor and the transformer primary winding are equal; said ram-on condition being reached when the stored energy levels in the inductor and transformer are zero. Alternatively, the inductance value of the inductor is greater than that of the transformer primary winding; in this case, the transformer, following turn off of the switching device, first discharges to zero and is then recharged by the inductor until said turn-on condition is reached. It is also possible to arrange for the inductor to have a lesser inductance than the transformer primary winding.

Detection of the turn-on condition can be effected in a number of ways because at this point, the flux in the transformer, and also in the inductor, ceases to change and the secondary current becomes zero. Of course, if the flux in the transformer or inductor ceases to change, the induced voltage in these components will become zero which is readily detected. Preferably, the transformer is provided with a sensing winding and the voltage induced in this winding is then monitored to determine when the turn-on condition has been reached. An alternative would be to monitor the current in the transformer secondary winding.

The on-time control means preferably comprises an output-voltage feedback loop including a low-pass filter for reducing a mains-related ripple component. Because this has the effect of reducing the responsiveness of the converter to load changes, a transient accelerator is advantageously included in the feedback loop, this transient accelerator being responsive to rapid changes and/or large deviations in said output voltage to bypass the low-pass filter and introduce these changes more quickly into said feedback signal.

Preferably, the feedback loop further comprises a minimum peak detector for detecting minimums in the voltage across the secondary winding of the transformer on the timescale of the mains frequency, the minimum voltage detector producing an output scaled and phase aligned with the output of the low-pass filter such as to act to cancel any residual ripple component in the latter.

According to another aspect of the present invention, there is provided a power supply comprising a rectifier arrangement for receiving an ac input and producing a rectified output at an output of the rectifier arrangement, and a regulator connected to the output of the rectifier arrangement and operative to provide a regulated dc output voltage; said regulator comprising:

a first energy-storing inductor, a switching device connected in series with said first inductor across the output of the rectifier arrangement, a control arrangement for controlling the cyclic turning on and off of the switching device at switching frequencies substantially greater than the frequency of said ac input, a second energy-storing inductor, a coupling capacitor connected in series with the second inductor across said switching device and valued to present a low impedance at said switching frequencies but a substantially higher impedance at the frequency of said ac input;

a rectifier diode, and a reservoir capacitor connected in series with the diode across the second inductor, said regulated dc output voltage being developed across said reservoir capacitor;

the control arrangement comprising switch-on timing means for mining on the switching device upon a turn-on condition being reached in which the first and second inductors have stored energy levels such that the inductors are equally balanced to charge one another, and on-time control means for maintaining the switching device on for a period dependent on the desired value of said regulated dc output voltage.

BRIEF DESCRIPTION OF THE DRAWINGS

Two switched mode power supplies embodying the invention will now be described, by way of non-limiting example, with reference to the accompanying diagrammatic drawings, in which.

BEST MODE OF CARRYING OUT THE INVENTION

Figure 3:
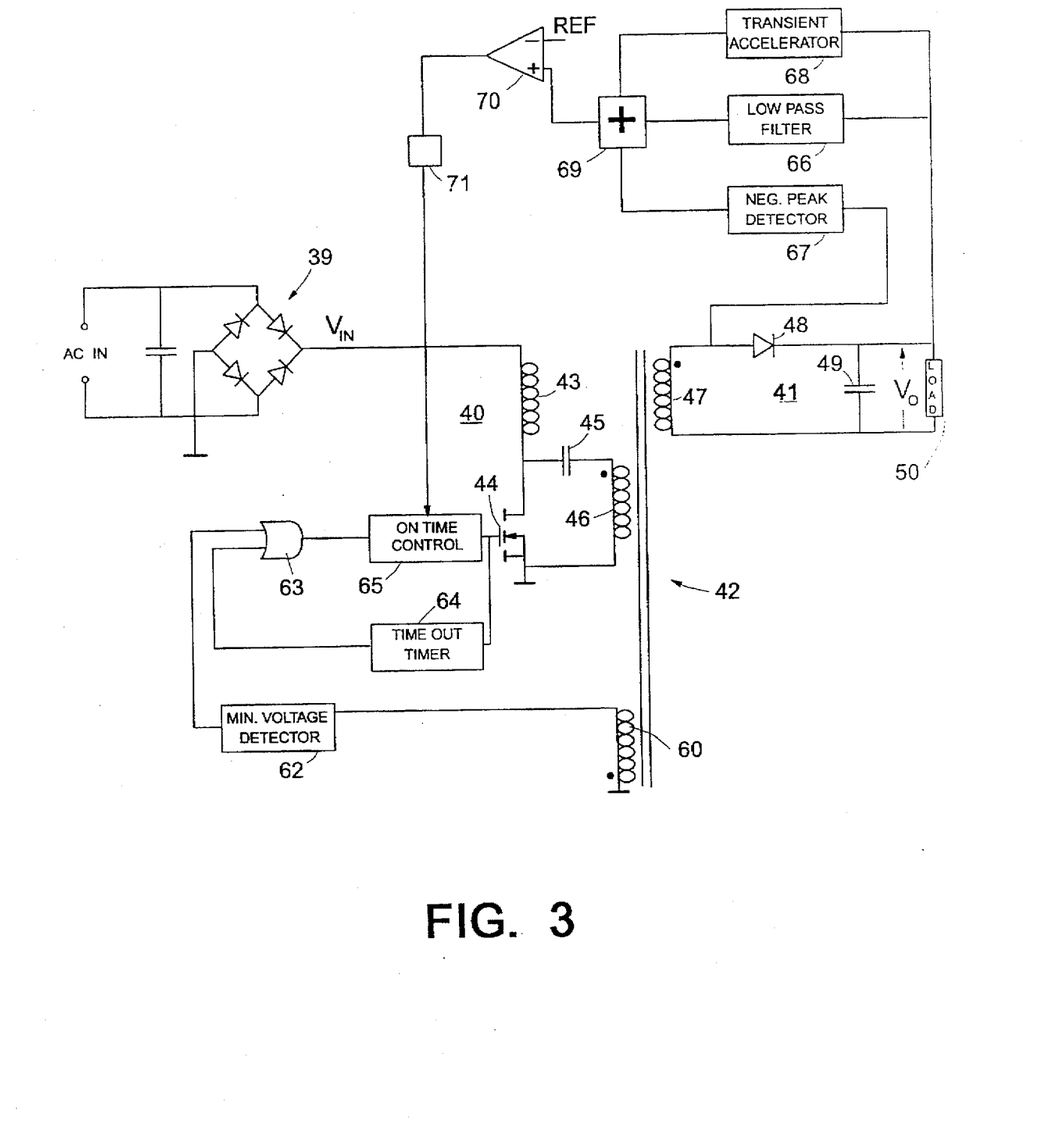
FIG. 3 is a circuit diagram of a first switched mode power supply embodying the present invention.

FIG. 3 shows a first switched mode power supply providing power factor correction in accordance with the present invention. This power supply comprises a bridge rectifier 39 connected on its ac side to an ac mains supply (typically at 50 Hz). The dc side of the bridge rectifier supplies a double rectified sine wave input voltage $V_{IN}$ to a modified form of flyback converter that provides a regulated output of voltage $V_O$. The modified flyback converter in turn comprises an input circuit 40 coupled to an output circuit 41 through an energy storing transformer 42.

The input circuit 40 is similar in form to the front end of a SEPIC regulator (see FIG. 2) and comprises an energy-storing inductor 43 connected in series with a switching device 44 across the output of the bridge rectifier 39, and a capacitor 45 connected in series with a primary winding 46 of the transformer 42 across the switching device 44. For the purposes of the following description, the inductance of inductor 43 is assumed to be the same as the inductance exhibited by the primary winding 46 with the secondary winding open (references below to the inductance of the transformer are to be understood as this inductance). Whilst it is preferred to have the inductance values of the inductor 43 and transformer 42 the same, this is not essential as will be explained later. The value of the capacitor 45 is such that it offers a high impedance at the ac mains frequency so as to block the passage of mains ripple, but a low impedance at the switching frequencies of the switching device 44.

The output circuit 41 is of standard form for a flyback converter and comprises a secondary winding 47 feeding a reservoir capacitor 49 through a diode 48, the output voltage $V_O$ being developed across the capacitor 49 for supplying a load 50.

To facilitate an understanding of the operation of the present invention, the winding ratio between the primary and secondary windings 46 and 47 is taken to be unity in the following description; in practice, this will generally not be the case, but the operating principles described below are not thereby affected.

The switching device 44 (here shown as a MOSFET by way of example only) is cyclically turned on and off by control circuitry comprising elements 60 to 71 to be described in more detail hereinafter. For the present it is sufficient to note that this circuitry includes an on-time control block 65 which controls:

the timing of turn on of the switching device, this being synchronised to occur immediately following the induced voltage in the transformer windings falling to zero (this function involves elements 60 to 65); and the duration of the on time of the switching device, this duration being adjusted in dependence on the value of the output voltage $V_O$ such as to keep the latter at a predetermined level (this function involves elements 65 to 71).

Due to this control regime, the switching frequency of the switching device 44 is not fixed but will vary, typically over a range of between 50–300 KHz.

Figure 4:
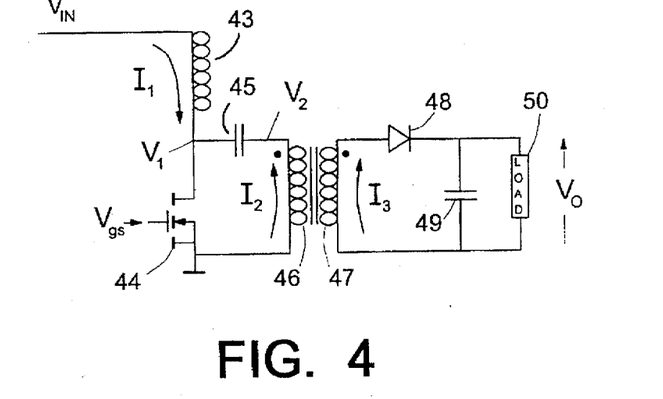
FIG. 4 is a circuit diagram of the principle components of the FIG. 3 switched mode power supply.

A description of the operation of the FIG. 3 circuit will now be given with reference to FIGS. 4 and 5. FIG. 4 shows the main components of the FIG. 3 converter (excepting the control circuitry) and indicates the main voltages and currents of interest. In particular, the input current that flows through inductor 43 is designated $I_1$, the voltage at the junction of the inductor 43 and switching device 44 is designated $V_1$; the voltage applied to the gate of the MOSFET constituting the switching device is designated $V_{gs}$; the voltage across, and current through, the primary winding 46 are respectively designated $V_2$ and $I_2$; the current through the secondary winding 47 is designated $I_3$; and the flux in transformer 42 is designeted $\Phi_T$.

Figure 5:
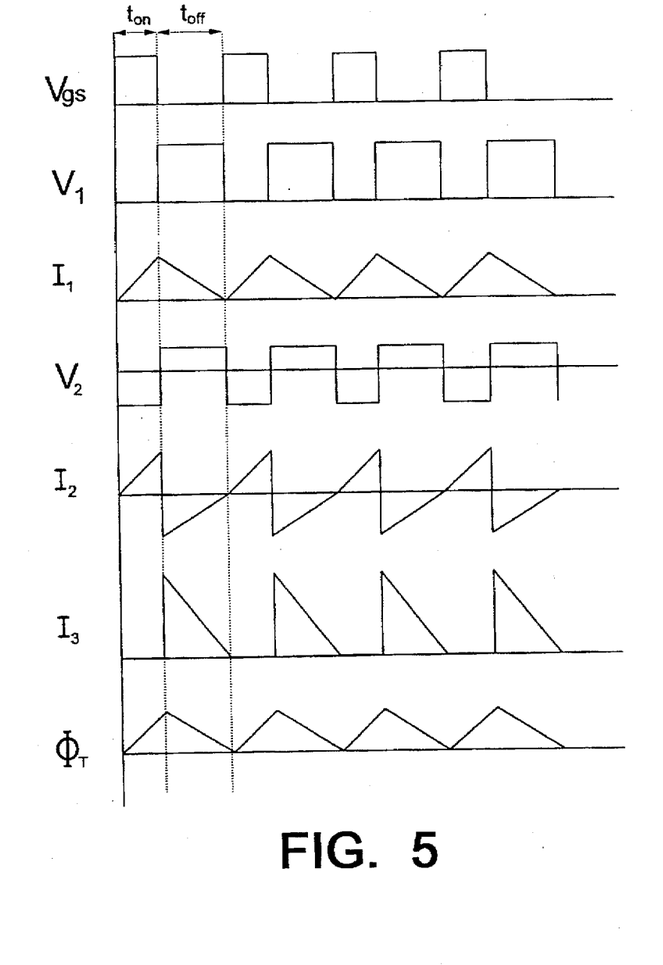
FIG. 5 shows voltage and current time plots illustrating operation of the FIG. 4 circuit for equal inductance values of first and second inductive components of the circuit.

FIG. 5 shows the time plots of $V_{gs}$, $V_1$, $I_1$, $V_2$, $I_2$, $I_3$, and $\Phi_T$ over four switching cycles of the switching device 44. Each switching cycle comprises a first period $t_{ON}$ when the device 44 is on ($V_{gs}$ high) and a second period $t_{OFF}$ when the device is off ($V_{gs}$ low). For the short time period covered by the illustrated four cycles, the input voltage $V_{IN}$ is assumed constant (which is reasonable since even though the input voltage varies sinusoidally, it does so at a much lower frequency that the switching frequencies of the switching device 44); the output voltage $V_O$ is also assumed constant over the illustrated four cycle period. On this basis, the switching frequency of the device 44 may also be taken as constant over the illustrated four cycle period and, indeed, each illustrated cycle of operation is substantially identical.

At the switching frequencies of the switching device 44, the voltage across the capacitor 45 will be substantially constant and equal to the input voltage $V_{IN}$. During the first period $t_{ON}$ of each cycle when $V_1$ is zero, the voltage $V_2$ will therefore be $-V_{IN}$ and both the inductor 43 and primary winding 46 will have the same driving voltage $V_{IN}$ thereacross causing the current through each ($I_1$, $I_2$ respectively) to increase at the same rate, their inductances being the same. Energy is thus stored into the inductor 43 and transformer 42. The current $I_3$ is zero during the period $t_{ON}$ as the diode 48 is reverse biased and the load 50 is powered by current drawn from the reservoir capacitor 49.

During the second cycle period $t_{OFF}$ when the switching device 44 is off, the energy stored in inductor 43 and transformer 42 is released to drive a current $I_3$ through the secondary winding 47 to recharge the reservoir capacitor 49 and power the load 50. More particularly, on turn off of the switching device 44, current $I_1$ has no choice but to pass through the primary winding 46 and $I_1$ and $I_2$ thus become the same current; it may be noted that this involves reversal of the current $I_2$. To compensate for this, $I_3$ (which can now flow due to the forward biasing of diode 48) takes on an appropriate value; for the present case of a winding ratio of unity between the primary and secondary windings, the current $I_3$ will take on a value at the start of the period $t_{OFF}$ which is equal to twice the value of $I_2$ at the moment the switching device is turned off. The rate at which $I_3$ decreases (and thus also $I_2$ and $I_1$) will depend on the output voltage $V_O$. With regard to the voltage $V_1$, on turn off of the switching device, the voltage $V_1$ will immediately rise to a level above $V_{IN}$ determined by the rate of decrease of current $I_1$; voltage $V_2$ will also rise by the same amount as $V_1$.

The rate of decrease of flux in the inductor 43 (this flux being a measure of stored energy) is, of course, of the same form as the current $I_1$. The rate of decrease of flux $\Phi_T$ in the transformer 42 is dependent on the rate of decrease of the currents $I_2$ and $I_3$, as is illustrated in FIG. 5. In the present case where the inductance of the inductor 43 and transformer 42 are the same, the flux of the inductor and transformer decrease at the same rate from the same starting value existing at the beginning of the period $t_{OFF}$. Thus, there will eventually arrive a common point in time when the fluxes in the inductor 43 and the transformer 42 reach zero; this, of course, corresponds to when the currents $I_1$, $I_2$ and $I_3$ reach zero. If the switching device 44 is left off, since neither the inductor nor the transformer has any stored energy and since the voltage across capacitor 45 balances the input voltage $V_{IN}$, the currents $I_1$, $I_2$ and $I_3$ would remain at zero with the fluxes in the inductor and transformer remaining constant at zero. In fact, in the present converter, the switching device 44 is turned on again immediately the rate of change of flux in the transformer (and thus the voltage induced in the transformer windings) becomes zero, and a new cycle of operation is commenced.

Figure 6:
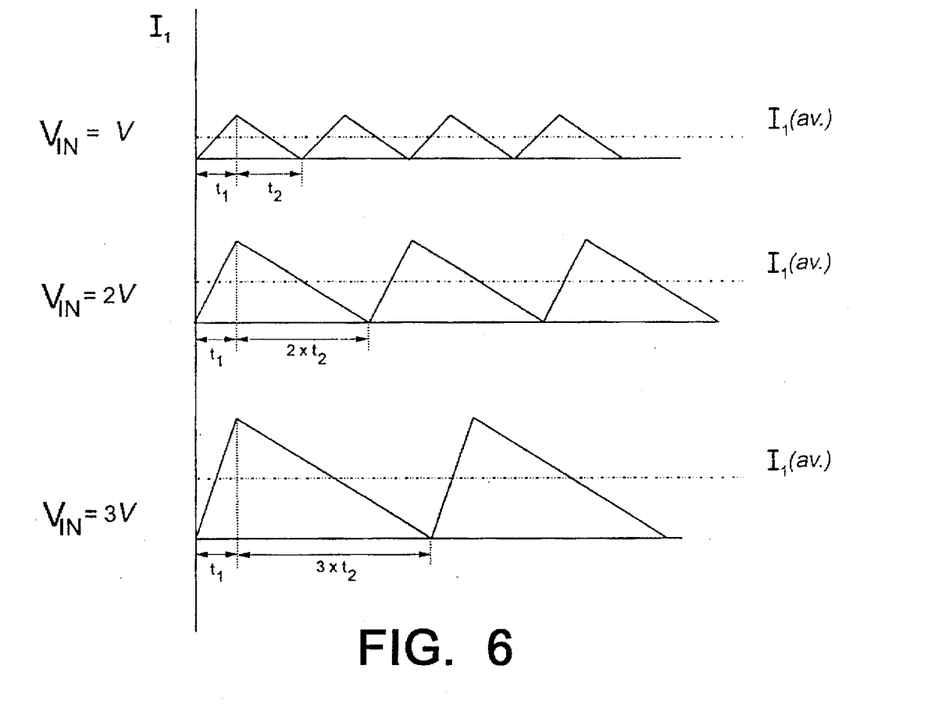
FIG. 6 is a current-time plot for the input current drawn by the FIG. 4 circuit for three different values of input voltage.

It can be seen from the time plot for the current $I_1$, that due to the continuous triangular form of the $I_1$ waveform, the average value of $I_1$ is proportional to the maximum value attained by this current. Since this maximum value is determined by the value of $V_{IN}$ and, indeed, is proportional to $V_{IN}$, the average value of the input current $I_1$ will be proportional to the input voltage $V_{IN}$. This behaviour is illustrated in FIG. 6 which shows the waveform of current $I_1$ for three different values of the input voltage, namely with $V_{IN}$ equal to V, 2V and 3V. As can be seen, with the value of $t_{ON}$ set at $t_1$, the maximum value of $I_1$, the average value of $I_1$ and the duration of the off cycle time period $t_{OFF}$, are all proportional to the value of the input voltage $V_{IN}$. As a result, as the input voltage varies as a rectified sine wave, the average current drawn will similarly vary in phase with the variations of input voltage; the converter thus appears as a resistive load, giving the desired power factor correction.

Although the foregoing explanation of the operation of the FIG. 4 circuit was developed with the on time $t_{ON}$ of the switching device being taken as constant, the timescale over which the on time $t_{ON}$ is varied is much longer than the variations of the input voltage so that the behaviour of the circuit as described above is still valid even when $t_{ON}$ is varied to maintain the output voltage at its value $V_O$.

It will be noted from FIG. 6 that the switching frequency of the switching device 44 is not fixed but will vary with the input voltage, this being due to the fact that the switching device is only turned back on upon the flux in the transformer falling to zero and staying there. As mentioned above in realtion to FIG. 3, this operation is achieved by the elements 60 to 65 of the converter control circuitry. This part of the control circuitry will now be described in more detail.

As already noted, the switching device is turned on when the flux in the transformer falls to zero and ceases to change so that no voltages are induced in the transformer windings; in other words, the induced voltage in the transformer windings will be at a minimum. This minimum is sensed in the FIG. 3 converter by an arrangement comprising a sensing coil 60 wound on the transformer core, and a minimum voltage detector 62 that detects when the voltage in the sensing coil falls to zero (this detector may, for example, be a zero voltage detector or a detector for detecting the negative-going edge of the sensed voltage waveform). The output of the detector 62 takes the form of a trigger signal fed via an OR circuit 63 to the on-time control block 65 to initiate turn on of the MOSFET 44. The operation of the control elements 60 to 65 thus causes the FIG. 3 converter to operate at the boundary between continuous and discontinuous modes of operation.

In order to cover situations (such as at start up and at zero points of the input voltage $V_{IN}$) when there is no induced voltage minimum to detect, a time-out circuit 64 is provided to ensure that a turn-on trigger signal is fed to the on-time control block a predetermined time after the gate signal $V_{gs}$ was last high, unless the MOSFET is earlier turned on again by a trigger signal from the detector 62.

The actual on-time duration is determined by the level of the fedback output voltage $V_O$, with the objective of keeping the latter constant. In general form, the feedback loop feeds a measure of the output voltage $V_O$ to an error amplifier 70 where it is compared with a reference value REF representative of the desired output voltage level; the resultant error signal produced in output by the error amplifier is then passed to the control block 65 through an isolator 71 (for example, an opto-isolator) and the control block 65 regulates the on time period $t_{ON}$ to minimise this error signal.

Figure 7:
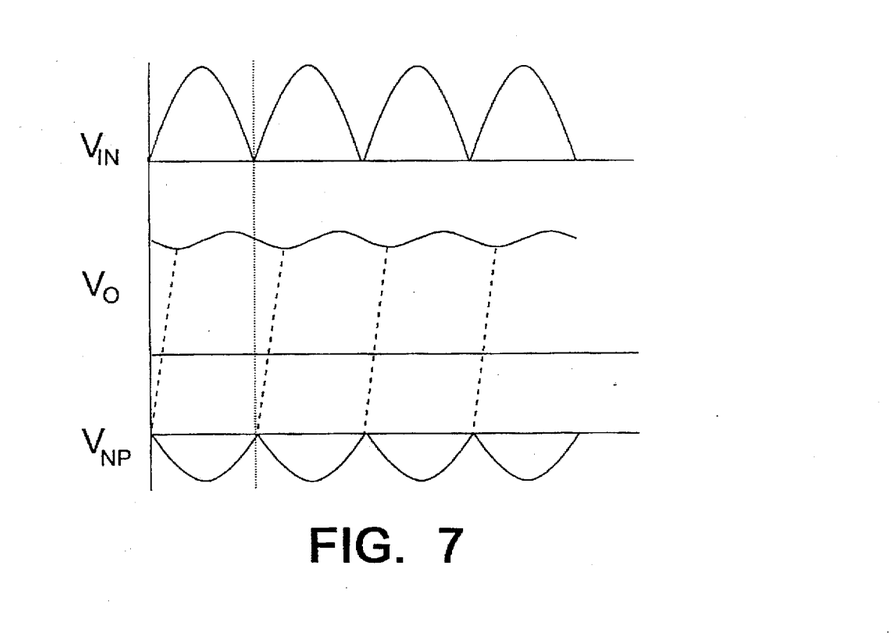
FIG. 7 shows voltage-time plots illustrating the operation of an output-voltage feedback loop of the FIG. 3 converter.

Unfortunately, the output voltage $V_O$ will carry a ripple at twice the ac mains frequency. The reason for this is that because the input voltage and current are in phase and vary in magnitude in correspondence with the double rectified sine wave of $V_{IN}$ produced on the dc side of the bridge 39 (see FIG. 7), the energy input to the converter output circuit 41 will also vary at the same frequency (100 Hz for 50 Hz mains frequency). Since energy is being continously supplied to the load 50 and the capacitor 49 is not infinite, the output voltage $V_O$ will vary with the rate of supply of energy to the output circuit 41; in other words, the output voltage $V_O$ will carry a 100 Hz ripple as shown in FIG. 7. Note that this ripple component is decreasing most rapidly at the zero points of $V_{IN}$ and increasing most rapidly at the maximums of $V_{IN}$.

If this ripple was visible in the feedback loop, it would result in the input current waveform being distorted from that required to present a fully resistive load to the ac mains. For this reason, the output voltage $V_O$ is fed back through a low pass filter 66 that cuts out most of this ripple (for example, at 100 HZ, the filter gain is 30 db down on that in the range 0-3 Hz).

The presence of the low pass filter means, of course, that the converter is slow in dynamic response—rapid changes in load can lead to significant (for example, 15%) transient errors in the output voltage. To reduce this problem, a transient detector 68 is provided. The transient detector is responsive to sudden or large changes in the output voltage to effectively bypass the low pass filter and pass the change immediately through to the error amplifier 70 (via an adder 69 to which the output of the low pass filter 66 is also connected). The design of a suitable transient detector will be apparent to persons skilled in the art.

Even though the low pass filter 66 substantially reduces the magnitude of the ripple component in the fedback output voltage, the filter 66 does not completely block this ripple component. In order to virtually eliminate the appearance of the ripple component in the voltage fed to the error amplifier 70, a third block 67 is provided to contribute to the error amplifier input signal. This block 67 serves to detect the negative peaks of the voltage across the secondary winding 47 and effectively generates a voltage $V_{NP}$ of inverse form to $V_{IN}$ (see FIG. 7). To do this, the block 67 is given a frequency response characteristic such that frequencies of the order of 100 Hz are passed but higher frequencies nearer the switching frequency of the MOSFET are blocked. The design of such a negative peak detector will be apparent to persons skilled in the art.

If now the voltage $V_{NP}$ is aligned with the ripple component as indicated by the dashed lines in FIG. 7 (this alignment may be effected by appropriate phase shining of either, in block 66 or 67 as appropriate), then the voltage $V_{NP}$, appropriately scaled, largely cancels out the ripple component when combined with the latter in adder 69. In this way, the ripple component is virtually eliminated from the fedback voltage. It may be noted that the voltage $V_{NP}$ could be introduced into the error signal produced in output by the error amplifier rather than into the input signal to the error amplifier.

The foregoing description of the operation of the FIG. 3 related to the case of where the inductance values of inductor 43 and transformer 42 were equal. If this is not the case, then during period $t_{OFF}$ there arrives a point where the inductive component 42, 43 with the lower inductance value has fully discharged; for a period thereafter, the higher-inductance component will charge the lower-value one whilst it itself continues to discharge. This continues until the inductor and transformer are equally charged but in opposite senses so each is trying to charge the other; in this condition, current through them both ceases to change—in other words, the inductor and transformer are effectively in balanced opposition. At this point, the stored energy in the two inductive components is in the ratio of their inductances. At the same time, the current $I_3$ reaches zero and because the currents in the inductor and transformer become constant, the voltage across the inductive components drops to zero; as previously, this event is detected rising the sensing winding 60 and detector 62 and the switching device 44 is switched on again.

The foregoing general explanation of the interaction of the inductor and transformer during the off period of the switching device is, in fact, equally valid for the case where their inductances are equal. However, in this case, the stored energy levels are zero in the inductor and transformer when these two balance each other and neither has the oppurtunity to charge the other.

Figure 8:
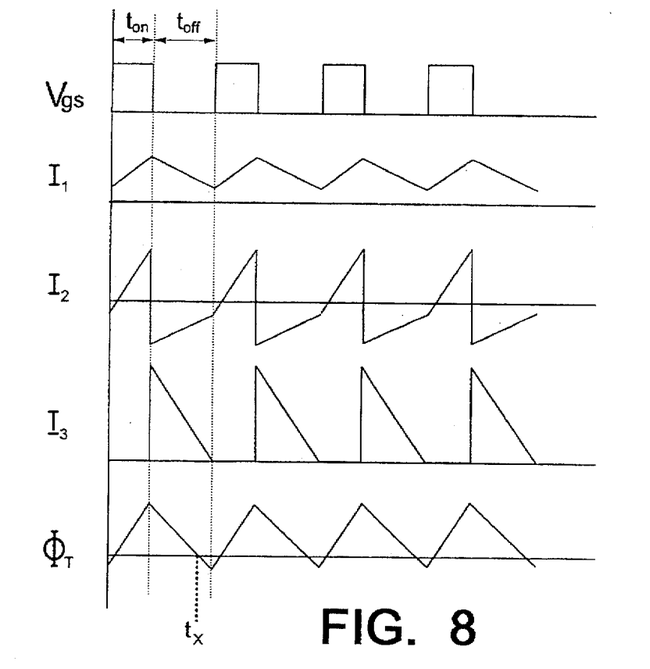
FIG. 8 shows voltage and current time plots similar to those of FIG. 5 but illustrating operation of the FIG. 4 circuit for the first inductive component of the circuit having a higher inductance value than the second inductive component.
Figure 9:
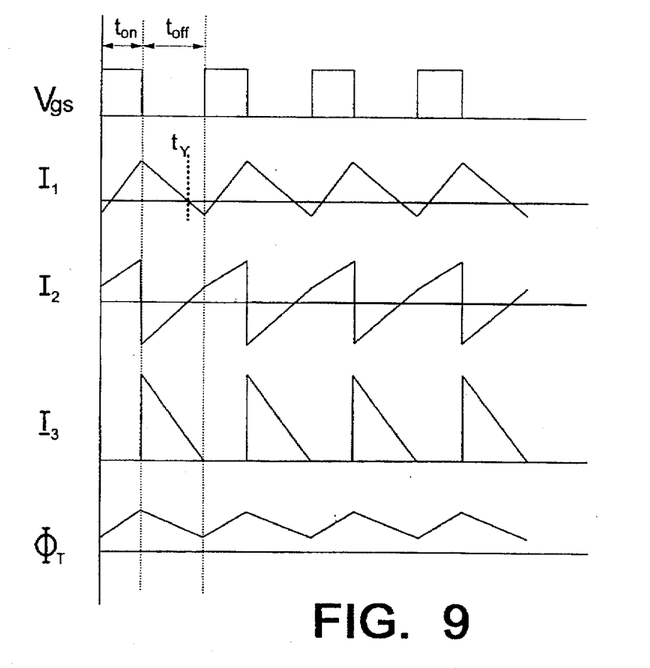
FIG. 9 shows voltage and current time plots similar to those of FIG. 5 but illustrating operation of the FIG. 4 circuit for the first inductive component of the circuit having a lower inductance value than the second inductive component.

Returning to a consideration of the cases where the inductor and transformer have different inductances, FIGS. 8 and 9 show the waveforms for $V_{gs}$, $I_1$, $I_2$, $I_3$ and $\Phi_T$ over four switching cycles, respectively for when the inductance value of inductor 43 is greater than that of the transformer 42 and for when it it is less. With the inductance value of the inductor 43 greater than that of the transformer 42 (FIG. 8 waveforms), the transformer becomes discharged at time $t_X$ during the off period $t_{OFF}$ (see flux waveform $\Phi_T$) and thereafter the transformer is charged by the inductor until it is equally and oppositely charged to the inductor. With the inductance value of the inductor 43 less than that of the transformer 42 (FIG. 9 waveforms), the inductor becomes discharged at time $t_Y$ during the off period $t_{OFF}$ (see flux waveform $\Phi_T$) and thereafter the inductor is charged by the transformer until it is equally and oppositely charged to the inductor. The reverse current flow through inductor 43 is permitted by a capacitor (not shown) connected across the dc side of the rectifier bridge 39; this capacitor has a high impedance at the ac mains frequency but a low impedance at the switching frequency of the switching device 44.

In both cases, it can be seen from FIGS. 8 and 9 that the current $I_1$ maintains its triangular form which, in combination with the fact that the offest of the current minimum from zero is proportional to the input voltage, results in the proportionality between input voltage and current being maintained.

Figure 10:
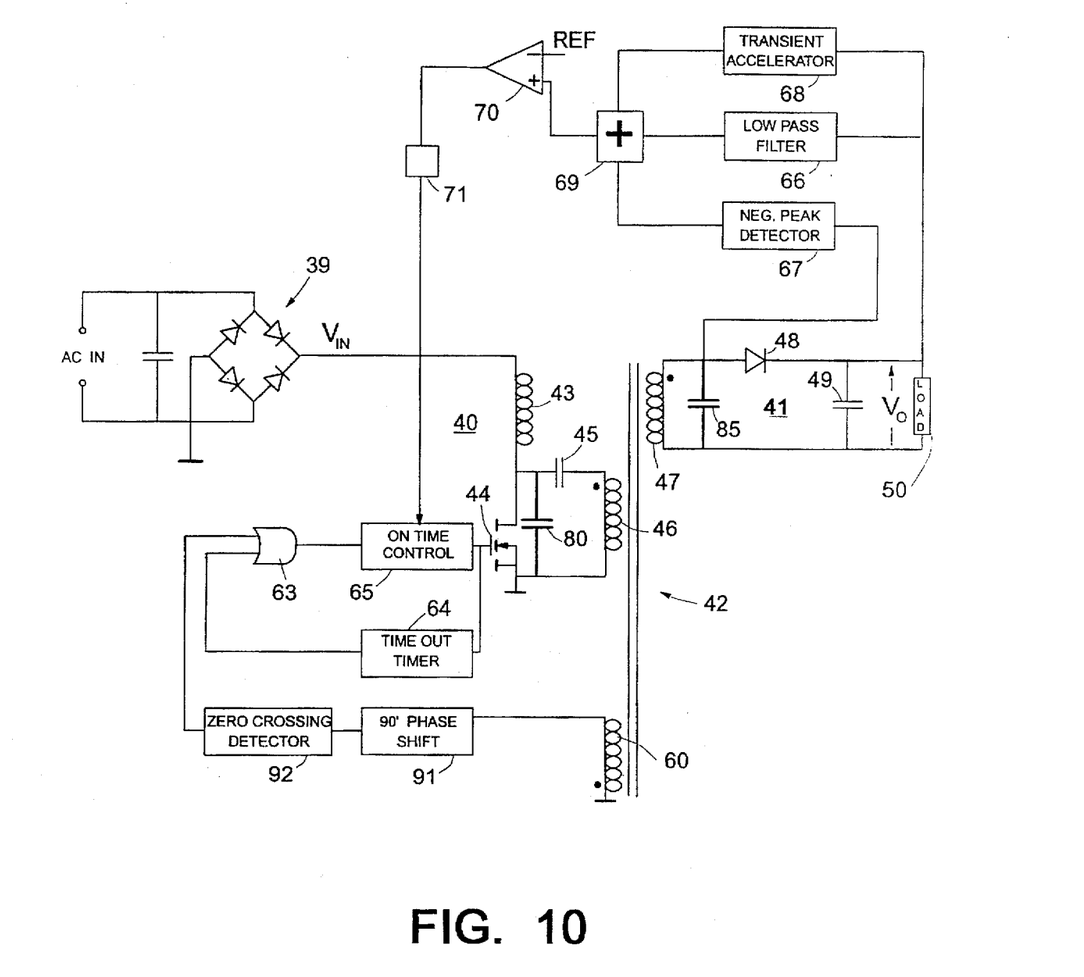
FIG. 10 is a circuit diagram of a second switched mode power supply embodying the present invention.

The present invention can advantageously be used in conjunction with the invention described in our co-pending European Patent Application of the same date entitled "Flyback Converter". In that application, a flyback converter is described in which at least part of the energy stored in the primary leakage inductance of the transformer is transferred to the converter output circuit and converted into a dc component of the converter output so that it is dissipated as useful energy in the load. This is achieved by providing first and second tuning capacitors connected across the transformer primary and secondary windings respectively. FIG. 10 of the present specification shows a switched mode power supply similar in form to that of FIG. 3 but provided with first and second tuning capacitances 80, 85 in accordance with the teaching of our aforesaid co-pending patent application. In the FIG. 10 arrangement, the first tuning capacitor 80 sets up a ringing on turn off of the switching device 44, this ringing being visible on the secondary side of the transformer 42. The second tuning capacitor 85 creates an anti-phase component to the ringing signal. The main ringing signal and the anti-phase component are then mixed in the non-linear device constituted by the rectifier diode 48 of the output circuit, to produce a dc component that can be dissipated in the load. Reference is directed to our aforesaid co-pending application for a more detailed description of the operation of the FIG. 10 circuit in relation to the effect of capacitors 80 and 85.

One point is, however, appropriate to mention here, namely that the switching device 44 is not turned on immediately the flux in the transformer falls to zero but a short while after when the voltage across the switching device reaches a minimum as it swings down at the resonance frequency established between the capacitors 80 and 85 and the primary winding 46. The reason for doing this is to minimize the dissipation in the device 44 of energy stored in the tuning capacitor 80. In order to detect this voltage minimum, the output of the sensing coil 60 is now connected to a 90 degree phase shifter 91 (for example, an integrator) which in turn is connected to a zero-crossing detector 92 that replaces the detector 62 of FIG. 3. With this arrangement, the voltage minimum occurring following the flux in transformer 42 first reaching zero, is represented by a zero crossing of the signal output by the phase shifter 91 and so is detected by the zero-crossing detector 92.

Various modifications can, of course, be made to the embodiments of the invention described above. For example, whilst the provision of blocks 66, 67 and 68 in the output-voltage feedback loop of the FIG. 3 converter is preferred, it is possible to practice the invention, with reduced effectiveness, without one or more or these blocks. Furthermore, detection of the point at which the switching device 44 should be turned back on could be effected by monitoring the secondary current $I_3$ and turning device 44 back on when $I_3$ falls to zero, or by monitoring the voltage across the inductor 43 and turning device 44 back on when this voltage falls to zero.

Figure 11:
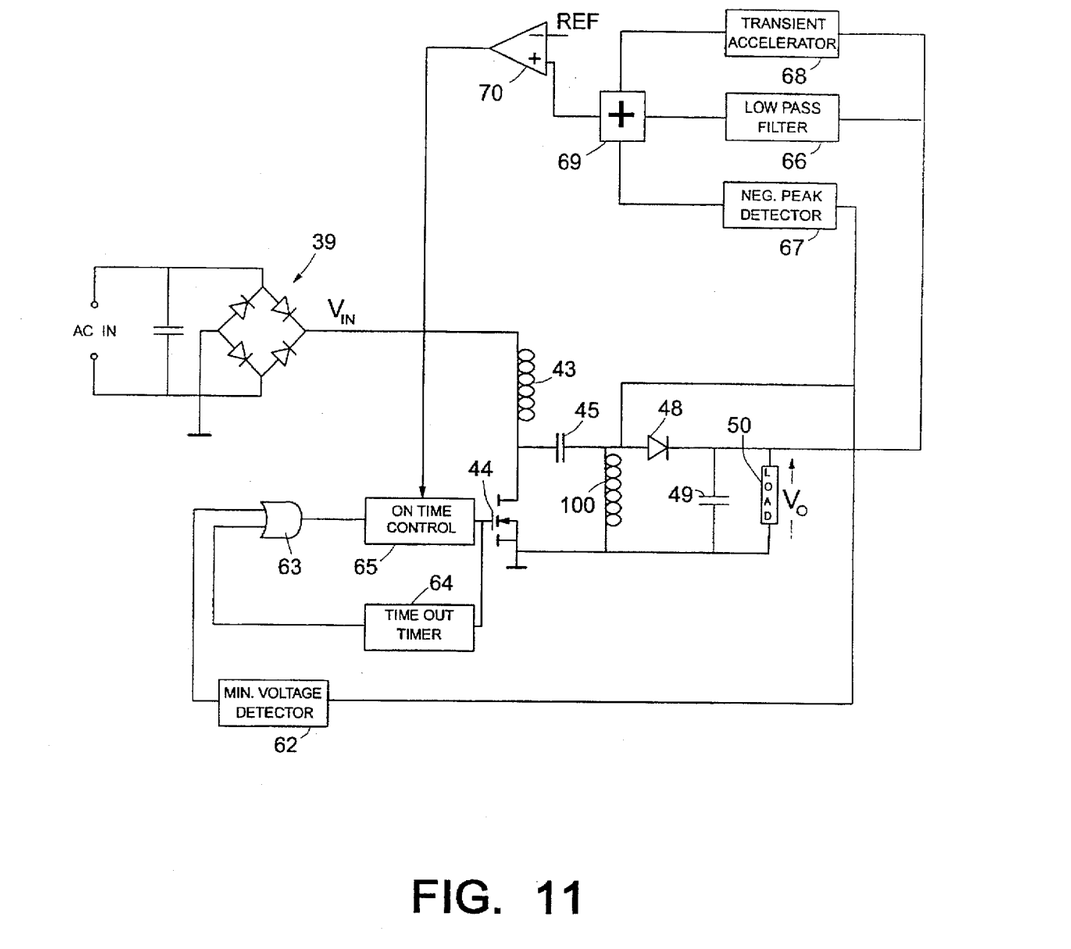
FIG. 11 is a circuit diagram of a third switched mode power supply embodying the present invention.

It is also possible to practice the invention in a converter without the isolation provided by a transformer—in other words, in a converter similar in general form to the SEPIC regulator described with reference to FIG. 2. Such an arrangement is illustrated in FIG. 11 of the accompanying drawings. Effectively, the operation of this arrangement corresponds to the operation of the FIG. 3 converter but with a second inductor 100 replacing the transformer 42, the current through this inductor corresponding to the combination of currents $I_2$ and $I_3$ (taking account of the turns ratio between the primary and secondary windings 46 and 47 of the transformer 42 of the FIG. 3 converter). It should also be noted that the phase of the signal fed to the minimum voltage detector 62 is opposite to that shown in the earlier embodiments.

I claim:

1. A power supply comprising:
   a rectifier arrangement for receiving an ac input and producing a rectified output at an output of the rectifier arrangement; and
   a flyback converter, the flyback converter including:
   an input circuit connected to the output of the rectifier arrangement,
   an output circuit for providing a regulated dc output voltage, and
   an energy-storing transformer that has primary and secondary windings respectively connected into said input and output circuits;
   the input circuit including:
   an energy-storing inductor,
   a switching device connected in series with said inductor across the output of the rectifier arrangement,
   a control arrangement for controlling the cyclic turning on and off of the switching device at switching frequencies substantially greater than the frequency of said ac input, and
   a coupling capacitor connected in series with the primary winding across said switching device and valued to present a low impedance at said switching frequencies but a substantially higher impedance at the frequency of said ac input;
   the control arrangement including:
   switch-on control means having detector means for detecting when a predetermined turn-on condition is reached in which the inductor and transformer have stored energy levels such that the inductor and transformer are equally balanced to charge one another, and turn-on means for turning on the switching device upon the detector means detecting the reaching of said predetermined turn-on condition; and
   on-time duration control means for maintaining the switching device on for a period dependent on the desired value of said regulated dc output voltage.

2. A power supply according to claim 1, wherein the inductance values of said inductor and the transformer primary winding are equal; said predetermined turn-on condition being reached when the stored energy levels in the inductor and transformer are zero.

3. A power supply according to claim 1, wherein the inductance value of said inductor is greater than that of the transformer primary winding; the transformer, following turn off of the switching device, first discharging to zero and then being recharged by the inductor until said predetermined turn-on condition is reached.

4. A power supply according to claim 1, wherein said detector means of said switch-on control means includes:
   sensing means for deriving a voltage proportional to the rate of change of flux in the transformer, this rate of change falling to zero when said predetermined turn-on condition is met, and
   determining means for determining a minimum of the voltage sensed by said sensing means;
   said turn-on means turning on the switching device at said minimum determined by said determining means.

5. A power supply according to claim 4, wherein said sensing means includes a sensing winding wound jointly with said primary and secondary windings of said transformer.

6. A power supply according to claim 4, wherein said switch-on control means further includes time-out means for initiating turn on of the switching device by said turn-on means a predetermined time after when switching device was last on unless the latter is earlier turned on again by said turn-on means.

7. A power supply according to claim 1, wherein said detector means of said switch-on control means includes:
   sensing means for monitoring the current in the transformer secondary winding, this current reaching zero when said predetermined turn-on condition is met, and
   determining means for determining when the secondary winding current as monitored by said sensing means falls to zero;
   said turn-on means turning on the switching device when said determining means determines that the secondary winding current has fallen to zero.

8. A power supply according to claim 1, wherein said on-time duration control means includes:
   output-voltage feedback means for providing a feedback signal indicative of said output voltage,
   comparison means for comparing said feedback signal with a reference in order to generate an error signal, said reference being representative of a desired value of said output voltage, and
   timing means for adjusting the on time of the switching device such as to minimize said error signal;
   said output-voltage feedback means including a low-pass filter connected to receive an input signal representative of said output voltage and operative to produce a corresponding output signal in which the magnitude of a ripple component contained in said input signal has been substantially reduced, this ripple component corresponding to a ripple present in said output voltage at twice the frequency of the ac mains, and the output signal of the low-pass filter forming, at least in part, said feedback signal.

9. A power supply according to claim 8, wherein said output-voltage feedback means further includes a transient accelerator responsive to rapid changes and/or large changes in said output voltage to bypass the low-pass filter and introduce these changes more quickly into said feedback signal.

10. A power supply according to claim 8, wherein said output voltage feedback means further includes a minimum peak detector for detecting minimums in the voltage across the secondary winding of the transformer on the timescale of the mains frequency, the minimum voltage detector producing an output scaled and phase aligned with the output of the low-pass filter such as to act to cancel any residual ripple component in the latter, the output of the minimum peak detector being introduced into one of said feedback signal and said error signal.

11. A power supply comprising:

a rectifier arrangement for receiving an ac input and producing a rectified output at an output of the rectifier arrangement; and a regulator connected to the output of the rectifier arrangement and operative to provide a regulated dc output voltage; said regulator including:

a first energy-storing inductor, a switching device connected in series with said first inductor across the output of the rectifier arrangement, a control arrangement for controlling the cyclic turning on and off of the switching device at switching frequencies substantially greater than the frequency of said ac input, a second energy-storing inductor, a coupling capacitor connected in series with the second inductor across said switching device and valued to present a low impedance at said switching frequencies but a substantially higher impedance at the frequency of said ac input;

a rectifier diode, and a reservoir capacitor connected in series with the diode across the second inductor, said regulated dc output voltage being developed across said reservoir capacitor;

the control arrangement including switch-on control means having detector means for detecting when a predetermined turn-on condition is reached in which the first and second inductors have stored energy levels such that the inductors are equally balanced to charge one another, and turn-on means for tuning on the switching device Upon the detector means detecting the reaching of said predetermined turn-on conditions; and on-time duration control means for maintaining the switching device on for a period dependent on the desired value of said regulated dc output voltage.

12. A power supply according to claim 11, wherein the inductance values of said first and second inductors are equal; said predetermined turn-on condition being reached when the stored energy levels in the inductors are zero.

13. A power supply according to claim 11, wherein the inductance value of said first inductor is greater than that of the second inductor; the second inductor, following turn off of the switching device, first discharging to zero and then being recharged by the first inductor until said predetermined turn-on condition is reached.

14. A power supply according to claim 11, wherein said switch-on control means includes:

sensing means for monitoring the voltage across said second inductor, this voltage falling to zero when said predetermined turn-on condition is met, and determining means for determining a minimum of the voltage sensed by said sensing means;

said turn-on means turning on the switching device at a said minimum determined by said determining means.

15. A power supply according to claim 14, wherein said switch-on control means further includes time-out means for initiating turn on of the switching device by said turn-on means a predetermined time after when switching device was last on unless the latter is earlier turned on again by said turn-on means.

16. A power supply according to claim 11, wherein said on-time duration control means includes:

output-voltage feedback means for providing a feedback signal indicative of said output voltage, comparison means for comparing said feedback signal with a reference in order to generate an error signal, said reference being representative of a desired value of said output voltage, and timing means for adjusting the on time of the switching device such as to minimize said error signal;

said output-voltage feedback means including a low-pass filter connected to receive an input signal representative of said output voltage and operative to produce a corresponding output signal in which the magnitude of a ripple component contained in said input signal has been substantially reduced, this ripple component corresponding to a ripple present in said output voltage at twice the frequency of the ac mains, and the output signal of the low-pass filter forming, at least in part, said feedback signal.

17. A power supply according to claim 16, wherein said output-voltage feedback means further includes a transient accelerator responsive to rapid changes and/or large deviations in said output voltage to bypass the low-pass filter and introduce these changes more quickly into said feedback signal.

18. A power supply according to claim 16, wherein said output voltage feedback means further includes a minimum peak detector for detecting minimums in the voltage across the second inductor on the timescale of the mains frequency, the minimum voltage detector producing an output scaled and phase aligned with the output of the low-pass filter such as to act to cancel any residual ripple component in the latter, the output of the minimum peak detector being introduced into one of said feedback signal and said error signal.

* * * * *